US011206531B2

(12) United States Patent
Kim et al.

(10) Patent No.: US 11,206,531 B2
(45) Date of Patent: Dec. 21, 2021

(54) METHOD AND DEVICE FOR CONNECTING CAPABILITY EXPOSURE FUNCTION AND NETWORK FUNCTIONS

(71) Applicant: Samsung Electronics Co., Ltd, Suwon-si (KR)

(72) Inventors: Sunghoon Kim, Seoul (KR); Youngkyo Baek, Seoul (KR); Jungje Son, Yongin-si (KR); Hoyeon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 16/341,829

(22) PCT Filed: Sep. 29, 2017

(86) PCT No.: PCT/KR2017/011085
§ 371 (c)(1),
(2) Date: Apr. 12, 2019

(87) PCT Pub. No.: WO2018/070740
PCT Pub. Date: Apr. 19, 2018

(65) Prior Publication Data
US 2021/0258769 A1  Aug. 19, 2021

(30) Foreign Application Priority Data
Oct. 12, 2016  (KR) .................. 10-2016-0131981

(51) Int. Cl.
*H04W 4/00* (2018.01)
*H04L 12/28* (2006.01)
(Continued)

(52) U.S. Cl.
CPC ........... *H04W 8/245* (2013.01); *H04M 15/66* (2013.01); *H04W 8/20* (2013.01); *H04W 8/26* (2013.01)

(58) Field of Classification Search
CPC ......... H04W 8/245; H04W 8/26; H04W 8/20; H04M 15/66
(Continued)

(56) References Cited

U.S. PATENT DOCUMENTS 9,930,516 B2    3/2018  Won et al.
2016/0007316 A1*  1/2016  Vaidya ................ H04W 64/003
                                                      370/312
(Continued)

FOREIGN PATENT DOCUMENTS

KR    10-2016-0055072 A    5/2016
WO      2016/161242 A1    10/2016

OTHER PUBLICATIONS

Summons to attend oral proceedings pursuant to Rule 115(1) EPC dated Jan. 13, 2021 in connection with European Application No. 17860627.3, 14 pages.
(Continued)

*Primary Examiner* — Mark G. Pannell

(57) ABSTRACT

Disclosed is a communication technique for merging, with IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail, security, and safety related services, and the like) on the basis of 5G communication technology and IoT related technology. The present invention presents a method for connecting, with each network function defined in a fifth generation mobile communication network, a capability exposure function (CEF) having a function of
(Continued)

exposing context of a terminal to a third party in a mobile communication network so as to provide management of the terminal or a mobility event for the terminal.

16 Claims, 9 Drawing Sheets

(51) Int. Cl.
 *H04W 8/24* (2009.01)
 *H04M 15/00* (2006.01)
 *H04W 8/20* (2009.01)
 *H04W 8/26* (2009.01)

(58) Field of Classification Search
 USPC ......................................................... 370/329
 See application file for complete search history.

(56) References Cited

U.S. PATENT DOCUMENTS

| | | | |
|---|---|---|---|
| 2016/0100362 A1 | 4/2016 | Palanisamy et al. | |
| 2016/0277243 A1 | 9/2016 | Kim et al. | |
| 2016/0286385 A1* | 9/2016 | Ryu | H04W 76/28 |
| 2017/0295557 A1* | 10/2017 | Chamarty | H04W 52/0225 |
| 2018/0192234 A1* | 7/2018 | Mohamed | H04L 67/2809 |
| 2018/0227837 A1* | 8/2018 | Starsinic | H04W 12/088 |

OTHER PUBLICATIONS

ZTE Corporation, et al., "Interconnection Function," S2-163255 (revision of S2-16xxxx), SA WG2 Temporary Document, SA WG2 Meeting #116, Vienna, Austria, Jul. 4-8, 2016, 4 pages.
Syed Husain et al., "Optimisations in machine type communications for sensor data networking", IET Wireless Sensor Systems, Aug. 1, 2016, 7 pages.
Samsung, "Update for Solution 4a: Non-IP small data transmission via SCEF", SA WG2 Meeting #111, Oct. 19-23, 2015, 4 pages, S2-153699.
Supplementary European Search Report dated Jun. 4, 2019 in connection with European Patent Application No. 17 86 0627, 13 pages.
"3rd Generation Partnership Project; Technical Specification Group Services and System Aspects; Study on Architecture for Next Generation System (Release 14)", 3GPP TR 23.799 V1.01.1 (Sep. 2016), 423 pages.
"3rd Generation Partnership Project; Technical Specification Group Services and System Aspects; Architecture enhancements to facilitate communications with packet data networks and applications (Release 14)", 3GPP TS 23.682 V14.1.0 (Sep. 2016), 99 pages.
Cisco Systems, Inc., "Enhancements to the solution for key issue# 7: IRF based network function interconnection model", SA WG2 Meeting #114, Apr. 11-15, 2016, 5 pages, S2-161430.
International Search Report dated Jan. 16, 2018 in connection with International Patent Application No. PCT/KR2017/011085, 3 pages.
Written Opinion of the International Searching Authority dated Jan. 16, 2018 in connection with International Patent Application No. PCT/KR2017/011085, 7 pages.
Communication pursuant to Article 94(3) EPC in connection with European Application No. 17860627.3 dated Apr. 30, 2020, 8 pages.
Cisco Systems, Inc., et al., "Solution to key issue 7: Interconnection and Routing Function (IRF) based network function interconnection model," S2-161181 (revision of S2-160951), SA WG2 Temporary Document, SA WG2 Meeting #113AH, Sophia Antipolis, France, Feb. 23-26, 2016, 6 pages.

\* cited by examiner

METHOD AND DEVICE FOR CONNECTING CAPABILITY EXPOSURE FUNCTION AND NETWORK FUNCTIONS

CROSS-REFERENCE TO RELATED APPLICATIONS

This application is a 371 of International Application No. PCT/KR2017/011085 filed on Sep. 29, 2017, which claims priority to Korean Patent Application No. 10-2016-0131981 filed on Oct. 12, 2016, the disclosures of which are herein incorporated by reference in their entirety.

BACKGROUND

1. Field

Although the new RAN (NR) and packet core (next generation core (NG Core)), which are a radio access network and a core network in a 5G network standardized by 3GPP, are described in specific descriptions of embodiments of the disclosure, the salient points of the disclosure can be also applied to any other communication system with a similar background by making minor modifications within a scope not far different from the scope of the disclosure. Such application could be determined by those skilled in the art to which the disclosure pertains. For convenience of the description, the disclosure uses certain terms and names defined in the standards of the 3rd generation partnership project long term evolution (3GPP LTE). However, the disclosure is not delimited by the terms and names and can be applied the same to a system according to any other standard as well.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as smart homes, smart buildings, smart cities, smart cars, connected cars, smart grids, health care, smart home appliances, or high-tech medical services through the convergence of the conventional Information Technology (IT) and various industries.

Accordingly, various attempts to apply the 5G communication to the IoT network have been made. For example, technologies, such as a sensor network, machine-to-machine (M2M), and machine type communication (MTC) are being implemented using the 5G communication technologies, such as beamforming, MIMO, and an array antenna. The application of a cloud RAN as the big data processing technology may be an example of convergence of 5G technology and IoT technology.

The disclosure proposes a method in which, in a mobile communication network, a capability exposure function (CEF), which has a function of managing a terminal or providing a mobility event in relation to the terminal by exposing a context of the terminal to a third party, is connected to each network function defined in a fifth generation mobile communication network. In the description hereinafter, network functions may be functions belonging to a specific network entity, that is to say, the specific network entity may be a set of various network functions. A CEF may be connected to either each network entity or each network function. In other words, the network function denotes a physically implemented network entity operating for a predetermined purpose, and one network entity may correspond to either one network function or multiple network functions. According to the disclosure, a CEF may search for each network function associated with a specific terminal and directly or indirectly negotiate with a corresponding network function so as to acquire information on the terminal, set an event, or transmit data.

SUMMARY

In order to solve the problem described above, a method for requesting information by a first network node according to an embodiment of the disclosure includes the operations of: transmitting a first message which makes a request for a connection to a network function supporting a terminal and includes an identifier of a context of the terminal, to a second network node managing terminal context information; receiving, from the second network node, a second message which is a response to the first message and includes identification information of the network function; and transmitting a third message requesting context information to a network entity corresponding to the received identification information.

A first network node according to another embodiment of the disclosure includes: a transceiver configured to transmit and receive a signal; and a controller configured to transmit a first message which makes a request for a connection to a network function supporting a terminal and includes an identifier of a context of the terminal, to a second network node managing terminal context information, receive, from the second network node, a second message which is a response to the first message and includes identification information of the network function, and transmit a third message requesting context information to a network entity corresponding to the received identification information.

A method for supporting by a second network node according to yet another embodiment of the disclosure including the operations of: receiving, from a first network node, a first message which makes a request for a connection to a network function supporting a terminal and includes an identifier of a context of the terminal; determining whether the request is valid, on the basis of identification information of the first network node included in the first message; and if it is determined that the request is valid, transmitting, to the first network node, a second message which is a response to the first message and includes identification information of the network function.

A second network node according to yet another embodiment of the disclosure includes: a transceiver configured to transmit and receive a signal; and a controller configured to receive, from a first network node, a first message which makes a request for a connection to a network function supporting a terminal and includes an identifier of a context of the terminal, determine whether the request is valid, on the basis of identification information of the first network node included in the first message, and if figure a mobility management context specialized for the corresponding terminal, subscribe to mobility management events of the corresponding terminal, configure session management for the corresponding terminal and configure a session management context, configure charging information of the corresponding terminal, and transmit small data for the corresponding terminal.

DETAILED DESCRIPTION

Figure 1:
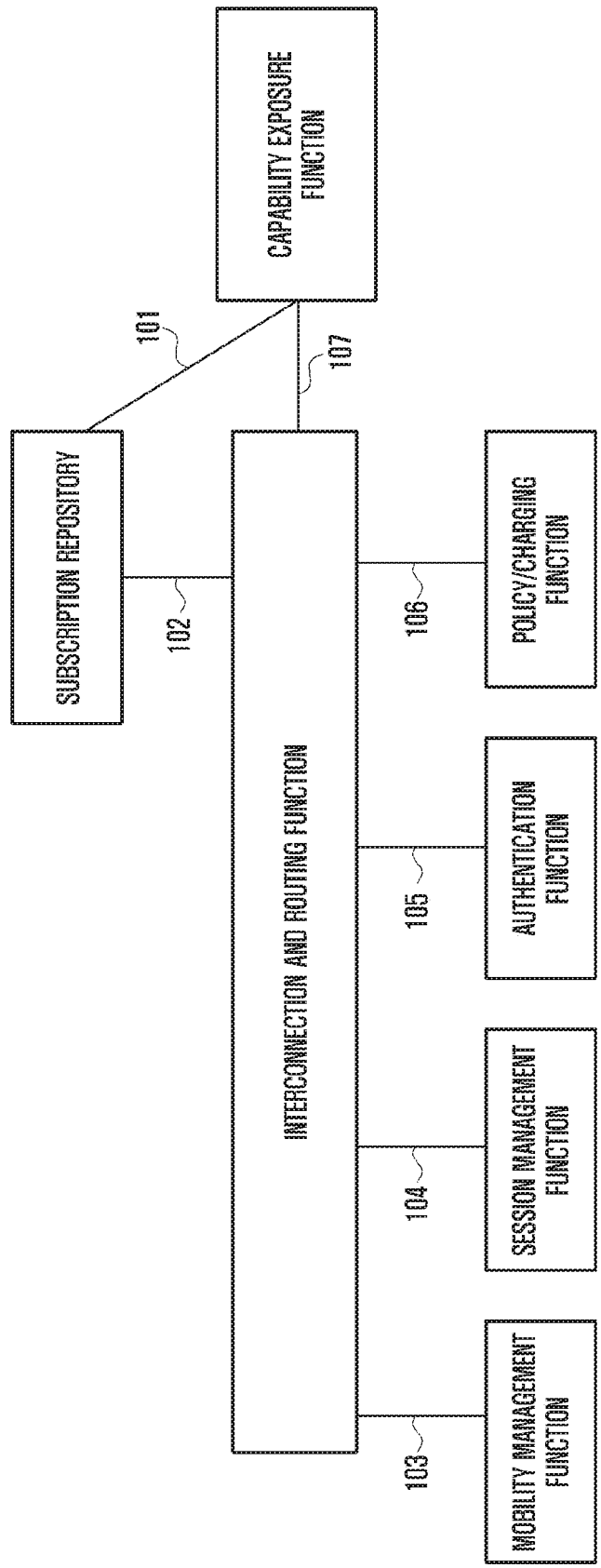
FIG. 1 illustrates connections between a capability exposure function and other network functions through a connection between an interconnection and routing function and the capability exposure function.

Hereinafter, embodiments of the disclosure will be described in detail in conjunction with the accompanying drawings. In the following description of the disclosure, a detailed description of known functions or configurations incorporated herein will be omitted when it may obfuscate the subject matter of the disclosure. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Although the new RAN (NR) and packet core (next generation core (NG Core)), which are a radio access network and a core network in a 5G network standardized by 3GPP, are described in specific descriptions of embodiments of the disclosure, the salient points of the disclosure can be also applied to any other communication system with a similar background by making minor modifications within the scope of the disclosure. Such application could be determined by those skilled in the art to which the disclosure pertains.

For convenience of the description, the disclosure uses certain terms and names defined in the standards of the 3rd generation partnership project long term evolution (3GPP LTE). However, the disclosure is not delimited by the terms and names and can be applied the same to a system according to any other standard as well.

The description of entities used in the disclosure is as follows.

A core network of 5G may include network functions as follows. A mobility management function (MMF) is a network function of managing mobility of a terminal. A session management function (SMF) is a network function of managing a packet data network connection provided for a terminal. An authentication function is a network function for authenticating a terminal to determine whether the terminal is allowed to use a corresponding mobile communication network. A policy/charging function is a network function of carrying out a mobile communication provider's service policy and charging in relation to a terminal. The network functions may be a combination of functions included in a common control network function (CCNF), which is a core network entity of 5G. For example, the CCNF may be a combination of network functions of mobility management and terminal authentication. In this case, the CCNF has the MMF and authentication function. The MMF is connected to the SMF, and the SMF is connected to the policy/charging function (PCRF). The CEF can access information according to which a terminal is managed, in a 5G network and thus can perform a configuration change for mobility management and configure a mobility management context specialized for the corresponding terminal, subscribe to mobility management events of the corresponding terminal, configure session management for the corresponding terminal and configure a session management context, configure charging information of the corresponding terminal, and transmit small data for the corresponding terminal.

First Embodiment—FIG. 1

FIG. 1 illustrates a structure in which each network function is connected through an interconnection and routing function (IRF).

The IRF is connected to the network functions through interfaces 102, 103, 104, 105, and 106, respectively. A CEF is connected to a subscription repository through interface 101. The CEF has no direct connection to each of the network functions and is connected to the IRF through interface 107. The CEF may request, through interface 107, the IRF to transmit a message to a specific network function. When a specific network function transmits a message for the CEF to the IRF, the IRF may transfer the message to the CEF through interface 107. The disclosure includes a proposal for identifiers used at each interface in order to transmit and receive mutual messages between a CEF and each network function.

1. The capability exposure function (CEF) first queries the subscription repository through interface 101 about the address of the interconnection and routing function (IRF) in order to be connected to a specific network function. The CEF may deliver a message including an identifier for a terminal, which is hereinafter referred to as an external ID meaning an externally used identifier, to the subscription repository. The CEF has been informed of a mobile communication provider serving the corresponding terminal and has been informed of a subscription repository address of the mobile communication provider. The CEF may allocate a reference ID to be used as a connection identifier between the CEF and the IRF and transmit the message together with the reference ID.

2. The subscription repository refers to the external ID included in the message and searches for an IMSI mapped thereto, which is a terminal identifier in a mobile communication network. When an IMSI of a terminal to which the subscription repository provides a service is not found, the subscription repository transmits a request rejection message to the CEF. When the IMSI is found, the subscription repository stores the reference ID, IMSI, and external ID received in procedure 1, with the reference ID associated with the IMSI and external ID. The subscription repository notifies the IRF through interface 102 that a connection request has been received from the CEF. The subscription repository includes, in this message, the IMSI of the terminal or the external ID, and the reference ID and CEF address received in procedure 1. Then, by means of the reference ID, a connection between the CEF and IRF, allocated to the terminal can be identified.

3. The subscription repository transmits a response to the CEF so as to notify of the address of the IRF and the reference ID. Since the CEF is notified of the address of the IRF, the CEF can use interface 107 and transmits a message confirming a connection between the CEF and IRF, to the IRF through interface 107. This message includes the external ID or IMSI of the terminal, the reference ID, and the CEF address.

The CEF may include, in the message, an indication as to whether the CEF is to establish a connection to the MMF of the terminal, is to establish a connection to the SMF thereof, is to establish a connection to the authentication function thereof, or is to establish a connection to the PCRF thereof. Otherwise the indication may be transmitted using an independent message on completion of procedure 4. The CEF may have an indication of being connected to a plurality of network functions.

4. The IRF receives the message and checks whether the CEF is connected to the IRF, by referring to the external ID or IMSI of the terminal, the reference ID, and the CEF address, which are included in the message. The IRF, having confirmed the connection in procedure 2, transmits a response to the CEF to acknowledge (ACK) establishment of the connection.

The IRF may provide a connection between the CEF and a specific network function providing a service to the terminal by referring to the transmitted indication in the message in procedure 3 as to what network function the CEF needs to be connected to. The IRF stores information that can confirm the connection between the two. The information may be stored in the form of an MMF ID and reference ID, an SMF ID and reference ID, an authentication function ID and reference ID, a PCRF and reference ID, or an ID and/or address of a network entity including the network functions and a reference ID. The IRF includes the routing information in the response message to be sent to the CEF and transmits the same. Then, the CEF can specify that a certain message is sent to a specific network function, by using a combination of an ID of the specific network function or an address of the specific network entity and a reference ID.

5. The CEF performs an information configuration/information request, intended for a network function having the corresponding information, by sending a message relating thereto to the IRF through the interface 107. The IRF, having received the message, determines what network function the request message is sent to, and transmits the request message to a corresponding network function among the network functions connected to 103, 104, 105, and 106. The network function, having received the message, may process an operation relating to the request and request the IRF to send a response relating thereto to the CEF. The IRF, having received the request, transmits the message, sent by the network function, to the CEF through interface 107 by identifying the message for the CEF according to the reference ID.

Figure 2:
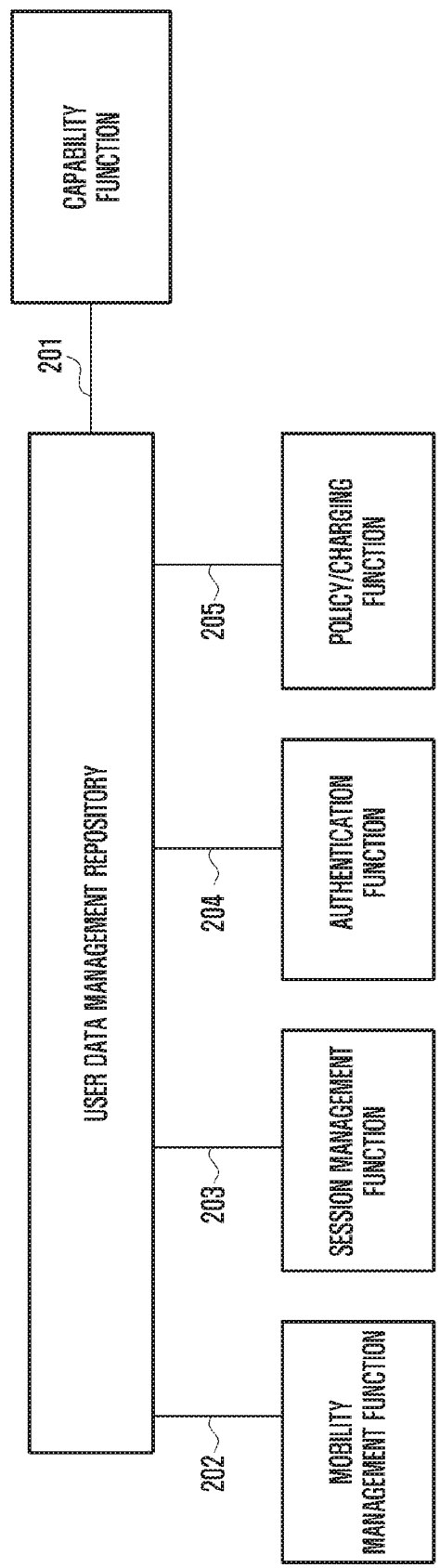
FIG. 2 illustrates a method for connecting a capability exposure function and other network functions through a connection between a user data management repository and the capability exposure function.

Second Embodiment—FIG. 2

FIG. 2 illustrates a structure in which each network function is connected through a user data management repository. The user data management repository is called a user data management (UDM), a user data repository or unified data repository (UDR), or a subscription data management (SDM). The user data management repository has been described as UDM (or UDR) for convenience in the disclosure. The UDM (or UDR) is a network entity managing all information for providing a mobile communication service to a terminal. Subscription information of the terminal is stored therein, and an MM context, SM context, charging context, authentication context may be stored therein as well. Each of the network functions may be connected to the UDM (or UDR) and check the subscription information of the terminal. Each of the network functions may store a terminal context used thereby in the UDM (or UDR) and update the context or query the UDM (or UDR) about the context. A network entity configured from a combination of individual network functions may be connected to the UDM (or UDR). An entity, for example, a control network function (CNF), may be configured from a combination of the MMF and SMF, and the CNF may be connected to the UDM (or UDR).

The UDM (or UDR) is connected to the CEF through interface 201. The UDM (or UDR) is connected to the MMF through interface 202. The UDM (or UDR) is connected to the SMF through interface 203. The UDM (or UDR) is connected to the authentication function through interface 204. The UDM (or UDR) is connected to the PCRF through interface 205. For a network entity configured from a combination of individual network functions, the UDM (or UDR) is connected to the corresponding network entity through another interface. The disclosure is not confined to the names of the interfaces. Proposed is a method for identifying a connection between a CEF and each network function or a network entity configured from a combination of individual network functions.

The CEF requests a connection to a specific terminal, from the UDM (or UDR) through interface 201 in order to access a terminal context managed by a specific network function. The CEF may deliver a message including an identifier for the terminal, which is hereinafter referred to as an external ID meaning an externally used identifier, to the UDM (or UDR). The CEF has been informed of a mobile communication provider serving the corresponding terminal and has been informed of a UDM address of the mobile communication provider. The CEF may allocate a reference ID to be used as a connection identifier between the CEF and the UDM (or UDR) and transmit the message together with the reference ID. Then, the UDM (or UDR) and CEF can identify the connection therebetween even by means of the reference ID and the ID of the terminal.

When a connection between the UDM (or UDR) and a terminal is set up, the CEF can identify whether the connection is a connection for mobility management (MM) of the terminal, a connection for session management thereof, a connection for authentication thereof, a connection for a policy thereof, or a connection for charging thereof. The connection may be identified according to identifiers for respective network functions. For example, if an identifier such as an MM is included, what is denoted thereby is a connection to an MM context, and if an identifier such as an SM is included, what is denoted thereby is a connection to an SM context. If no identifier indicating a network function to be connected thereto is included, the CEF may suppose that connections to all contexts of the terminal are established.

When a connection to the UDM (or UDR) is set up, the CEF may make a request in the representational state transfer ful (RESTFUL) form. RESTFUL denotes a network structure between a server and client by means of a REST style. The REST style denotes a technique of defining a network structure as a resource, establishing an address of the resource, so as to configure the corresponding resource or acquire a value thereof. The CEF may use such a technique when connected to the UDM. It is assumed that the CEF and UDM (or UDR) have a terminal context structured as a resource and share a mutual structure system, that is, a uniform resource identifier (URI). For example, if the CEF needs to access a resource of a location in an MM context of a terminal to acquire information thereon, the CEF can transmit, to the UDM (or UDR), a uniform resource identifier (URI) in a form, such as UDM.CEF.UE_ID.MM. Location. UE_ID may denote an external ID or IMSI, CEF may be an ID of the CEF, and UDM (or UDR) may be an ID of the UDM (or UDR). An instruction, such as UDM.CEF.UE_ID.MM.Location.get( ), may be executed as a message acquiring location information of the terminal. Instead of using a UDM (or UDR) ID or a CEF ID, a reference ID for identification of a connection between the CEF and UDM (or UDR) may be included. For example, a URI may be in the form such as Reference_ID.MM.Location.

The UDM (or UDR) may determine what terminal context is the UDM (or UDR) to access, by referring to the RESTFUL style defined above. The CEF may query about a specific context of the terminal by using the RESTFUL style defined above, or set an event to receive a notification when information of the terminal is changed (For example, Reference_ID.MM.Event.Location.subscribe( )).

All information related to the terminal is managed in the UDM (or UDR). Specifically, in the UDM (or UDR), the information related to the terminal may be managed either integrally within the terminal or based on classification of contexts according to the MM/SM/PCRF of the terminal. When the information is integrally managed, the URI may be in the form of Reference_ID.Location.

Each network function or a network entity configured from a combination of individual network functions updates the UDM (or UDR) with information of the terminal whenever the contexts of the terminal are changed. Therefore, the CEF can request for an access to an up-to-date terminal context each time.

Figure 3:
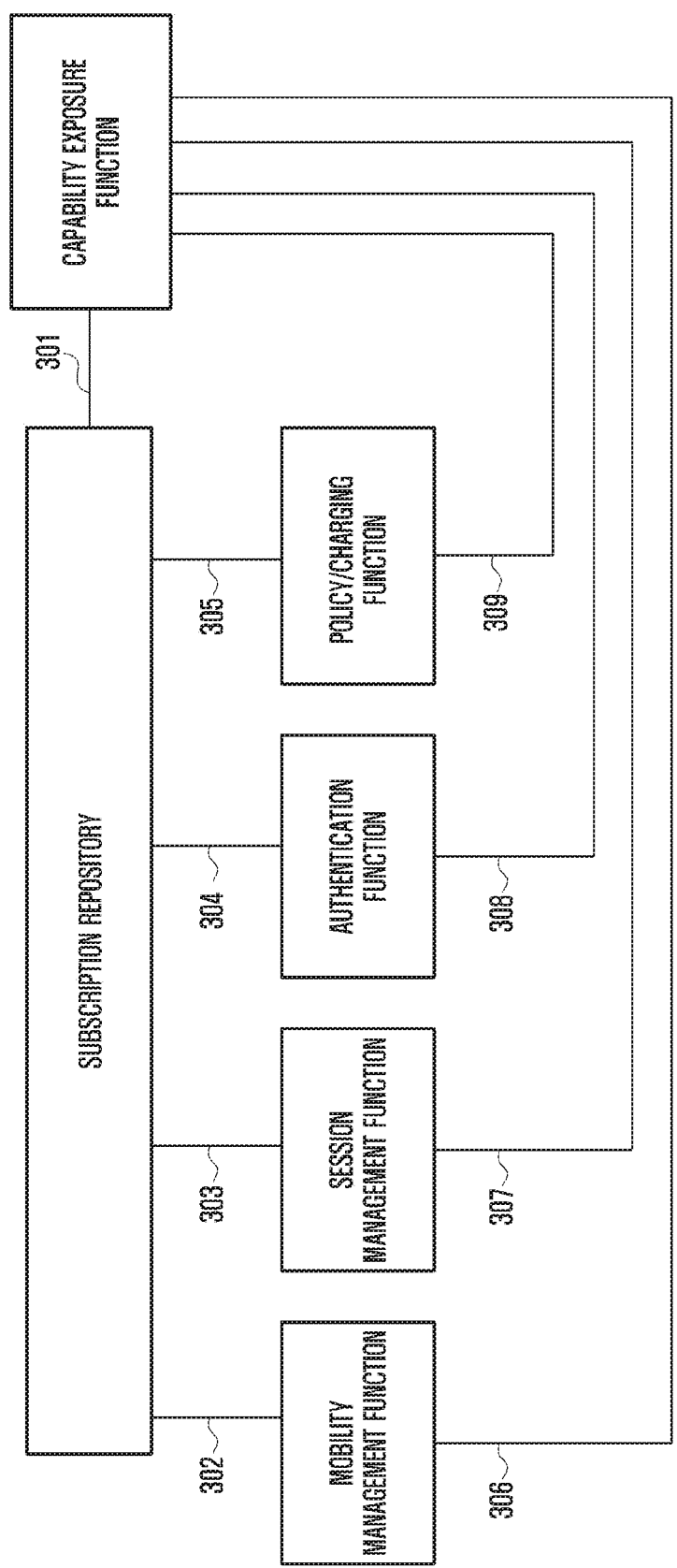
FIG. 3 illustrates a method for connecting a capability exposure function and other network functions through a connection between a subscription repository and the capability exposure function.

Third Embodiment—FIG. 3

FIG. 3 illustrates a structure in which each network function is connected through a subscription repository, and each of the network functions is connected to a CEF. The subscription repository is a network entity managing all information for providing a mobile communication service to a terminal. Subscription information of the terminal is stored therein, and an MM context, SM context, charging context, authentication context may be stored therein as well. Each of the network functions may be connected to the subscription repository and check the subscription information of the terminal. Each of the network functions may store a terminal context used thereby in the subscription repository and update the context or query the UDM (or UDR) about the context. A network entity configured from a combination of individual network functions may be connected to the subscription repository. An entity, for example, a control network function (CNF), may be configured from a combination of the MMF and SMF, and the CNF may be connected to the subscription repository. This CNF may be connected to the CEF to transmit or receive terminal context information.

1. The CEF sends a request message to the subscription repository in order to be connected to each network function or a network entity, which serve the terminal, and obtain permission for connection of the CEF to the terminal. This message may include: an external ID or IMSI, which is an ID of the terminal to which the CEF is to establish a connection; a reference ID, which allows identification of a connection between the CEF and subscription repository; and a CEF ID. The reference ID is allocated by the CEF. The CEF may include an indicator indicating a network function to be connected, depending on what network function the CEF is to acquire a terminal context of among network functions serving the terminal. For example, if a connection to MM-related information of the terminal is required, indicator MM may be included, if a connection to SM-related information of the terminal required, indicator SM may be included, and if a connection to PCRF-related information of the terminal is required, indicator PCRF may be included.

2. The subscription repository performs an operation for granting a connection request of the CEF. The subscription repository may refer to the CEF ID and the ID of the terminal, check the IMSI of the corresponding terminal, and refer to subscription information and terms of service agreement, so as to determine whether to permit the CEF to be connected to the subscription repository or each of the network functions in relation to the corresponding terminal. After the permission operation, the subscription repository may acquire IDs of the MMF, SMF, Authentication function, and PCRF serving the terminal and transmit the acquired IDs to the CEF. Otherwise, after the permission operation, the subscription repository may find indicators of specific network functions serving the terminal in the request made by the CEF through procedure 1, acquire IDs of the network functions, and transmit the acquired IDs to the CEF. The IDs may denote address values allowing a connection to the specific network functions or network entity configured from a combination of network functions.

3. The subscription repository may deliver the CEF ID and the reference ID, which is a connection identifier used for establishing a connection from the CEF to each of the network functions or a network entity configured from a combination of network functions. This message includes the IMSI for identifying the terminal. The network functions or network entity, having received this message, stores this information.

4. The CEF refers to the IDs of the network functions or network entity acquired from the subscription repository through procedure 2 and attempts to connect to the corresponding network functions or network entity. The CEF ID and the reference ID allocated and used in the previous procedures are included. The network functions or network entity, having received this message through each interface, may determine validity of the message on the basis of the reference ID and CEF ID stored therein in procedure 3. Each of the network functions or network entity may send a response message to the CEF.

While procedure 4 is performed, the CEF may also request specific information of the terminal, set an event according to a change of information of the terminal, or make a request for configuring information of the terminal, together with the performance of the procedure. The network functions or network entity, having received the request or configuration, may send a response thereto to the CEF.

If an SMF serving the terminal is changed, an MMF or a network entity including the MMF, having a connection established to the CEF by the previous operation, may notify the CEF that the SMF has been changed. The MMF or network entity includes the ID of a changed SMF in this message and sends the message, and the CEF, having received the message, may establish a connection to the new SMF again by using the reference ID.

If the serving MMF of the terminal is changed, the subscription repository, having a connection established to the CEF by the previous operation, notifies the CEF that the MMF has been changed, and includes the ID of a new MMF in this message and transmits the message. For another method, if the serving MMF is changed, the old MMF may notify the CEF of the ID or address of a new MMF, and the CEF may establish a connection again to the new MMF.

Figure 4:
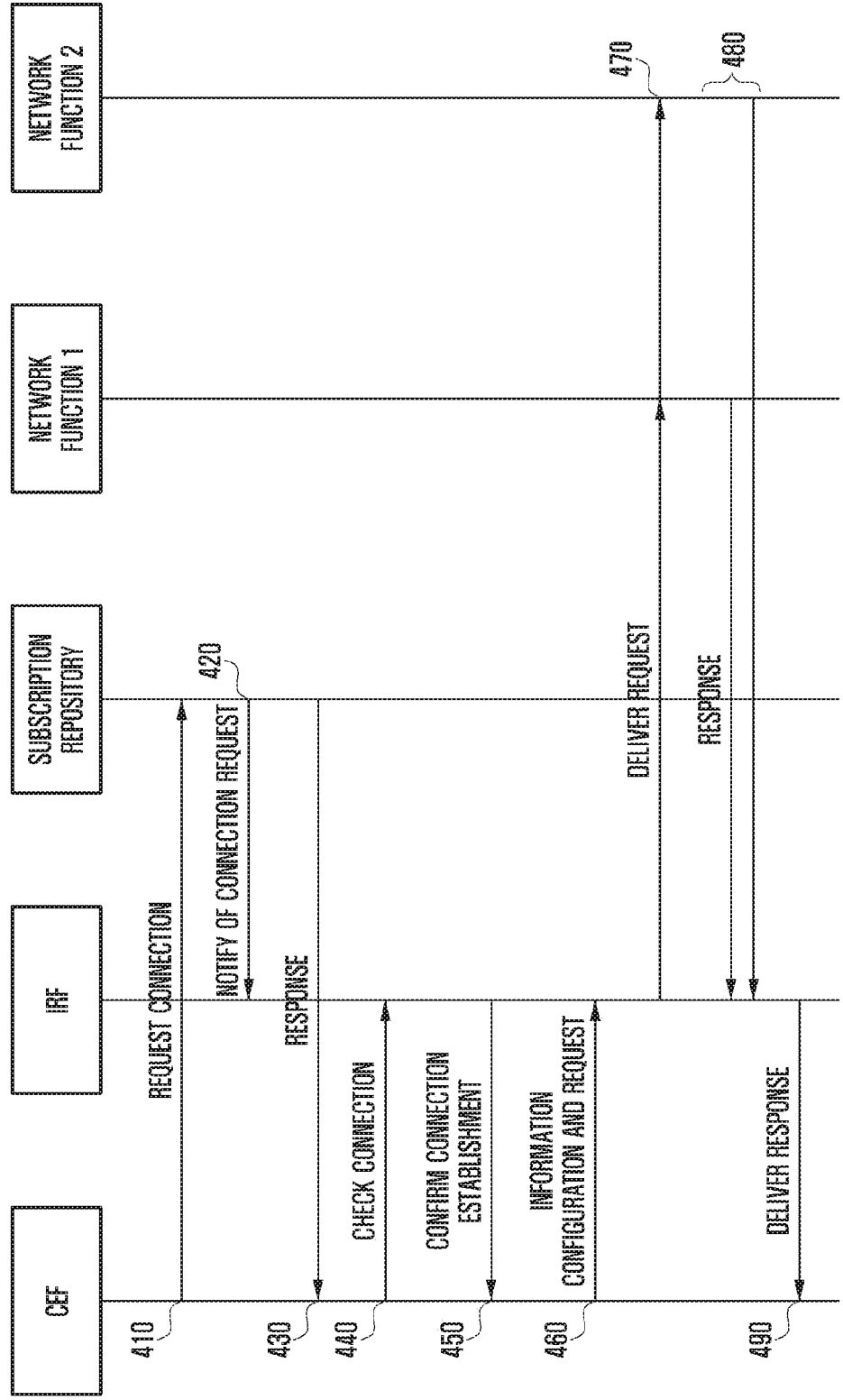
FIG. 4 is a flow chart illustrating operating processes between a CEF, network nodes, and entities according to the embodiment described in FIG. 1.

FIG. 4 is a flow chart illustrating operating processes between a CEF, network nodes, and entities according to the embodiment described in FIG. 1. FIG. 4 illustrates operations between a CEF, an IRF, a subscription repository, network function 1, and network function 2. It is understood that the proposed embodiment is not delimited to the illustrated contents and could be extendably applied to a scenario in which the greater or smaller number of network functions are connected.

For connection to a specific network function, the CEF transmits a connection request which queries a subscription repository about the address of an IRF (410). The connection request may include an external ID for a terminal, and a reference ID, which is an identifier between the CEF and the IRF. The subscription repository, having received the connection request, identifies the terminal on the basis of the external ID. When the IMSI of the terminal is identified, the subscription repository associates the reference ID with the IMSI and external ID and stores the associated reference ID, IMSI, external ID. The subscription repository subsequently notifies the IRF that the connection request has been received from the CEF (420). By this operation, a connection between the IRF and CEF can be identified by means of the reference ID.

The subscription repository transmits a response to the CEF so as to notify of the address of the IRF and the reference ID (430). The CEF is informed of the address of the IRF by the received response and transmits a message for connection confirmation to the IRF (440). The message for connection confirmation may include at least one of the external ID, IMSI, reference ID, and CEF address and may also include an indicator indicating a function of the terminal, which is supported by a network node to which the CEF will be connected.

The IRF checks whether the CEF is one having been connected to the IRF, by referring to information included in the received message and confirms connection establishment by transmitting a response to the CEF, depending on a result of the checking (450). The IRF refers to the indicator transmitted by the CEF so as to discover what network function the CEF needs to be connected to, and stores and manages information according to which a connection between the CEF and a specific network function providing a service to the terminal can be identified. Such information for routing may be delivered to the CEF while being included in the message in operation 450 described above.

The CEF performs configuration of and request for information that the CEF needs, intended for a network function having the information, by sending a message relating thereto to the IRF through an interface with the IRF (460). The IRF checks, at the request of the CEF, what network function the request message is to be delivered to, and delivers the request message to a corresponding network function among network functions 1 and 2 (470). The network function, having received the request message, processes an operation according to the request and transmits a response thereto to the IRF (480), and the IRF delivers, to the CEF, the received response (490).

Figure 5:
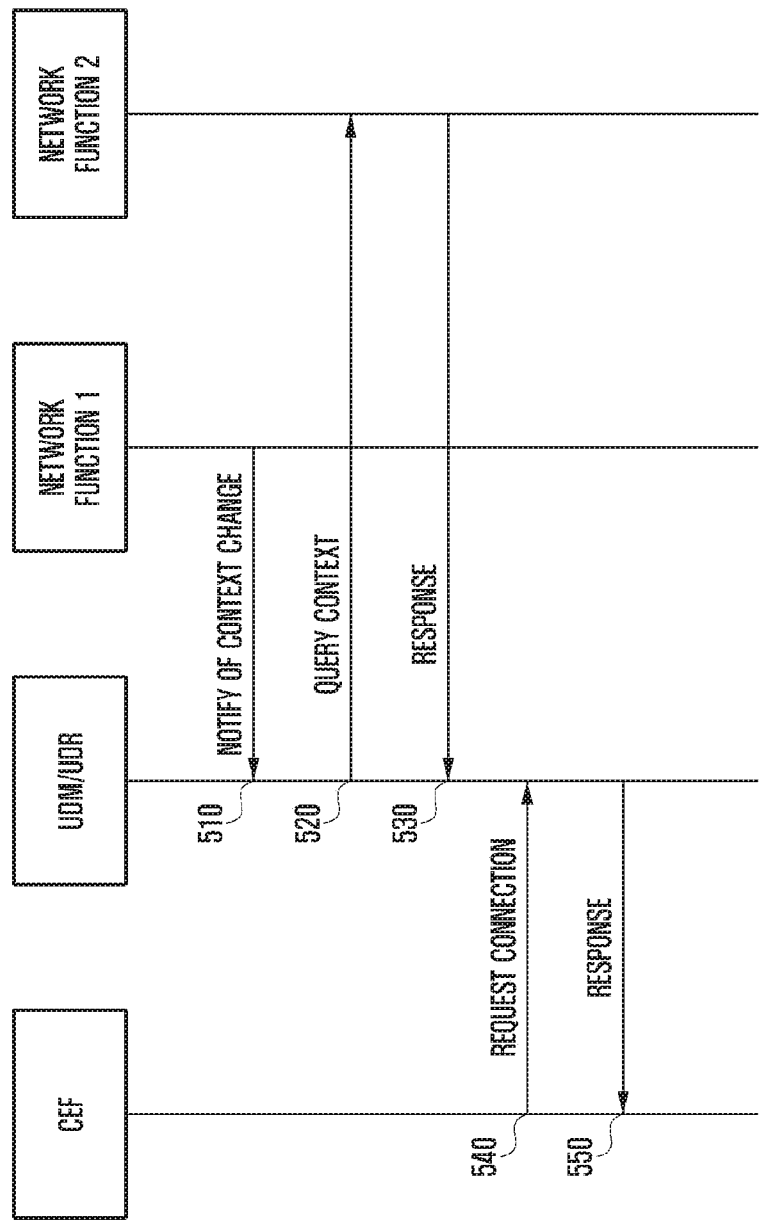
FIG. 5 is a flow chart illustrating operating processes between a CEF, network nodes, and entities according to the embodiment described in FIG. 2.

FIG. 5 is a flow chart illustrating operating processes between a CEF, network nodes, and entities according to the embodiment described in FIG. 2. FIG. 5 illustrates operations between a CEF, a UDM (or UDR), network function 1, and network function 2. It is understood that the proposed embodiment is not delimited to the illustrated contents and could be extendably applied to a scenario in which the greater or smaller number of network functions are connected.

The UDM (or UDR) is a network entity (network node) for managing all information for providing a service to a terminal and may store and manage subscription information and context information of the terminal. Each of the network functions may store, in the UDM (or UDR), a terminal context supported thereby and update the stored context (510), and the UDM (or UDR) may query each of the network functions about the context and receive a response thereto, thereby keeping the terminal context information up to date (520, 530).

The CEF transmits a connection request message to the UDM (or UDR) in order to access terminal context information managed by a specific network function (540). Such a connection request message may include an external ID, which is an external identifier of the terminal, and a reference ID, which is an identifier between the CEF and UDM (or UDR). In addition, when a connection to the UDM (or UDR) and terminal is set up, the CEF may also transmit the connection request message in a state where the message includes an identifier for identifying what function is to be connected thereto. As already described above with reference to FIG. 2, such a connection request message may be in the RESTFUL style.

The UDM (or UDR) may determine what context is to be accessed, by referring to the connection request message received from the CEF, and transmit a specific terminal context being managed by the UDM (or UDR), to the CEF in response thereto (550). As described above, the UDM (or UDR) may keep the terminal context up to date by using notification of a context change or a query/response, and manage the same in an integrated manner.

Figure 6:
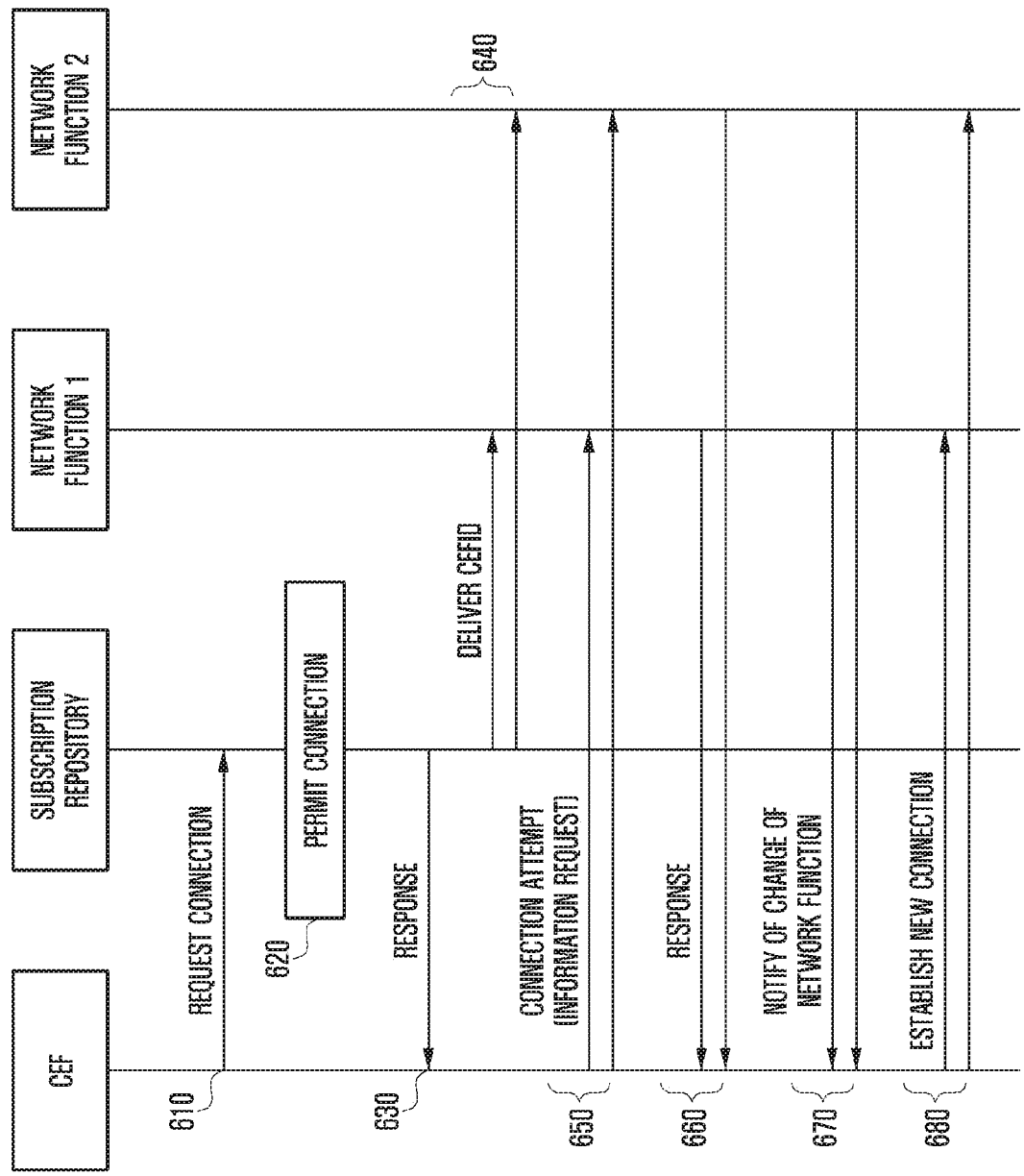
FIG. 6 is a flow chart illustrating operating processes between a CEF, network nodes, and entities according to the embodiment described in FIG. 3.

FIG. 6 is a flow chart illustrating operating processes between a CEF, network nodes, and entities according to the embodiment described in FIG. 3. FIG. 6 illustrates operations between a CEF, a subscription repository, network function 1, and network function 2. It is understood that the proposed embodiment is not delimited to the illustrated contents and could be extendably applied to a scenario in which the greater or smaller number of network functions are connected.

The subscription repository is a network entity (network node) for managing all information for providing a service to a terminal and may store and manage subscription information and context information of the terminal. Each of the network functions may be connected to the subscription repository to refer to the subscription information of the terminal and store a terminal context supported thereby in the subscription repository. The subscription repository may keep the terminal context information up to date by receiving, from the network functions, notification that the context information has been changed or using a query and response.

The CEF transmits a connection request message to the subscription repository in order to be connected to the network functions or entity supporting the terminal and also obtain permission for connection of the CEF to the terminal (610). This connection request message may include at least one of an external ID, an IMSI, each of which is ID of the terminal, a reference ID for identifying a connection between the CEF and subscription repository, and a CEF ID, and may include an indicator indicating what network function the CEF needs to acquire context information supported by.

The subscription repository, having received the connection request of the CEF, grants the connection request (620). The subscription repository may refer to the IMSI of the terminal by using the CEF ID and external ID and refer to subscription information, terms of service agreement, etc. so as to determine whether the CEF can be connected to the subscription repository and network functions in relation to the terminal, and permit the connection.

If the connection has been permitted, the subscription repository acquires the ID and/or address value of each of the network functions supporting the terminal and transmits a response relating thereto to the CEF (630). The subscription repository delivers the CEF ID and the reference ID, which is an identifier to be used to establish a connection from the CEF to each of the network functions or a network entity corresponding to a combination of a plurality of network functions (640). In this operation, the IMSI for identifying the terminal may be included. The network functions and entity, having received the identifiers, stores the received information.

The CEF attempts to connect to the corresponding network functions and/or network entity by using the IDs and/or address values of the network functions and network entity, included in the response message received from the subscription repository (650). In such a connection operation, the reference ID may be included and used. The network functions and/or network entity, having received a message for the connection attempt, may determine validity of the message for the connection attempt on the basis of the reference ID and CEF ID stored therein and transmit a determination result to the CEF in response to the message (660).

When the message for the connection attempt is transmitted, the CEF may also request specific context information of the terminal, set an event according to a change of information of the terminal, or transmit a request for configuring information of the terminal, together with the transmission of the message. Each of the network functions and/or entity may also transmit a response to such a request and configuration, together with the message.

If a connection between the CEF and network entities is established, when a network function supporting the terminal is changed, the network functions and/or network entity may notify the CEF thereof (670). In such an operation, if the ID of a changed network function is delivered to the CEF, together with the notification, the CEF may establish a connection to a new network entity (680). In addition, the subscription repository may notify the CEF that the network function supporting the terminal is changed.

Figure 7:
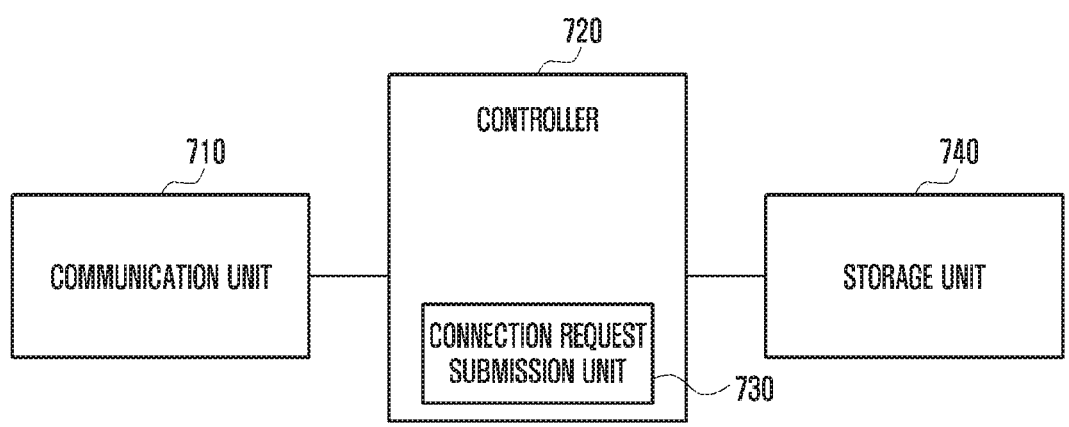
FIG. 7 is a block diagram illustrating the structure of a CEF according to an embodiment.

FIG. 7 is a block diagram illustrating the structure of a CEF according to an embodiment. Referring to FIG. 7, the CEF may include a communication unit (710), a controller (720), and a storage unit (740). The controller (720) may be hereinafter defined as a circuit, an application specific integrated circuit, or at least one processor, and the controller (720) may include a connection request submission unit (730).

The communication unit (710) communicates with a network entity, a network function, and network nodes and transmits/receives a signal. The communication unit (710) may communicate with any other network entity, node, or functions through a wired connection and may also wirelessly communicate therewith through an RF module.

The controller (720) may control general operations of the CEF according to the embodiments described above. For example, the controller (720) may transmit a connection request to at least one of a subscription repository, IRF, and UDM, or request context information of a terminal from at least one of the subscription repository, IRF, UDM, and network entity.

The connection request submission unit (730) transmits, to an external network node, a request message requesting information of a terminal. The connection request submission unit (730) may also receive a response to the request message to be directly or indirectly connected to a network function providing context information so as to acquire the context information. It is understood that the controller (720) could play a role of the connection request submission unit (730) described above.

The storage unit (740) may store at least one of information transmitted/received by the communication unit (710) and information generated by the controller (720).

Figure 8:
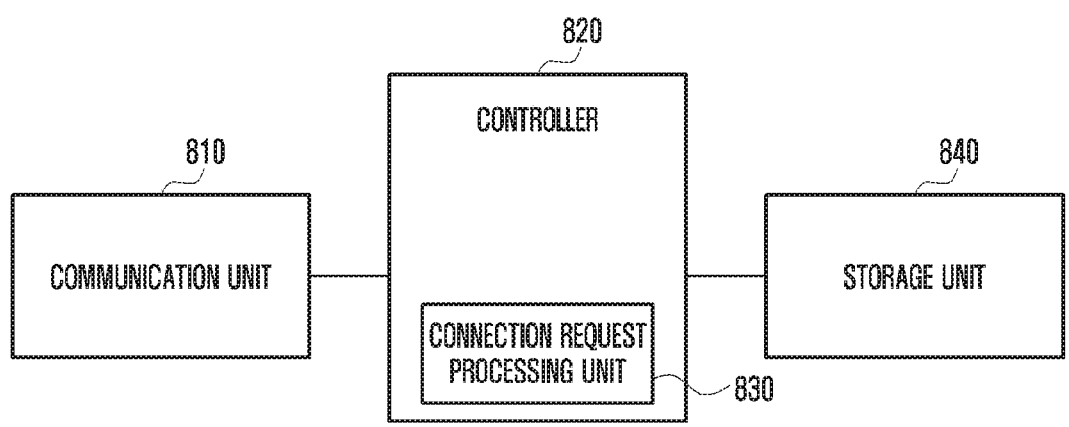
FIG. 8 is a block diagram illustrating the structure of a network node according to an embodiment.

FIG. 8 is a block diagram illustrating the structure of a network node according to an embodiment. Referring to FIG. 8, the network node may include a communication unit (810), a controller (820), and a storage unit (840). The controller (820) may be hereinafter defined as a circuit, an application specific integrated circuit, or at least one processor, and the controller (820) may include a connection request processing unit (830). The network node may denote at least one of the IRF, UDM (or UDR), and subscription repository described above.

The communication unit (810) communicates with a network entity, a network function, and network nodes and transmits/receives a signal. The communication unit (810) may communicate with any other network entity, node, or functions through a wired connection and may also wirelessly communicate therewith through an RF module.

The controller (820) may control general operations of the network node according to the embodiments described above. For example, the controller (820) may receive a connection request from a CEF, handle the connection request, and transmit a response to the CEF.

The connection request processing unit (830) receives, from the CEF, a request message requesting information of a terminal and analyzes the request message. The connection request processing unit (830) may also communicate with any other network functions and entities to provide context information to the CEF, in response to the request message and may deliver acquired context information to the CEF. The connection request processing unit (830) may also determine whether the connection request of the CEF is valid. It is understood that the controller (820) could play a role of the connection request processing unit (830) described above.

The storage unit (840) may store at least one of information transmitted/received by the communication unit (810) and information generated by the controller (820).

Figure 9:
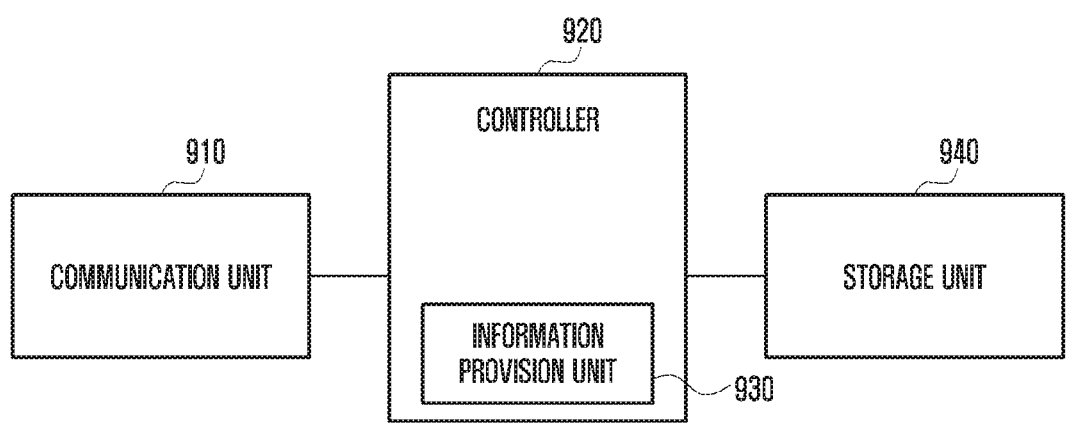
FIG. 9 is a block diagram illustrating the structure of a network function according to an embodiment.

FIG. 9 is a block diagram illustrating the structure of a network function according to an embodiment. Referring to FIG. 9, the network node may include a communication unit (910), a controller (920), and a storage unit (940). The controller (920) may be hereinafter defined as a circuit, an application specific integrated circuit, or at least one processor, and the controller (920) may include an information provision unit (930). In the embodiment, the network function may denote the network function and/or network entity, described above, providing a service to the terminal.

The communication unit (910) communicates with a network entity, a network function, and network nodes and transmits/receives a signal. The communication unit (910) may communicate with any other network entity, node, or functions through a wired connection and may also wirelessly communicate therewith through an RF module.

The controller (920) may control general operations of the network function according to the embodiments described above. For example, the controller (920) may transmit context information of a terminal to the outside at a request of a CEF.

The information provision unit (930) transmits, to the outside, terminal context information stored therein and being managed thereby, on the basis of a context request directly received from the CEF or a context request received from at least one of the IRF, UDM, and subscription repository. It is understood that the controller (920) could play a role of the information provision unit (930) described above.

The storage unit (940) may store at least one of information transmitted/received by the communication unit (910) and information generated by the controller (920).

Although exemplary embodiments of the disclosure have been shown and described in the specification and drawings with specific terms used therein, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

The invention claimed is:

1. A method performed by a capability exposure function (CEF) in a mobile communication system, the method comprising:
   transmitting, to a unified data repository (UDR), a first message for requesting information on an interconnection and routing function (IRF) associated with a service for a terminal, the first message including an identifier of the terminal;
   receiving, from the UDR as a response to the first message, a second message including address information of the IRF identified based on the identifier of the terminal;
   transmitting, to a network function associated with the service via the IRF, a third message for requesting the service; and
   receiving, from the network function via the IRF, a fourth message as a response to the third message,
   wherein the UDR delivers, to the network function, identification information of the CEF included in the first message, and
   wherein the network function identifies validity of the third message based on the identification information of the CEF.

2. The method of claim 1, wherein the second message further includes a reference identifier for a connection between the CEF and the IRF.

3. The method of claim 1, wherein the first message indicates a resource for a context of the terminal by using a representational state transfer ful (RESTFUL) style,
   wherein the context of the terminal to which the UDR accesses is identified by the RESTFUL style, and
   wherein the context of the terminal comprises at least one of a mobility management context, a session management context, a charging context, and an authentication context.

4. The method of claim 1, wherein the network function comprises at least one of a mobility management function, a session management function, an authentication function, and a policy/charging function.

5. A capability exposure function (CEF) in a mobile communication system, the CEF comprising:
   a transceiver configured to transmit or receive a signal; and
   a controller coupled with the transceiver and configured to:
   transmit, to a unified data repository (UDR), a first message for requesting information on an interconnection and routing function (IRF) associated with a service for a terminal, the first message including an identifier of the terminal,
   receive, from the UDR as a response to the first message, a second message including address information of the IRF identified based on the identifier of the terminal,
   transmit, to a network function associated with the service via the IRF, a third message for requesting the service, and
   receive, from the network function via the IRF, a fourth message as a response to the third message,
   wherein the UDR delivers, to the network function, identification information of the CEF included in the first message, and
   wherein the network function identifies validity of the third message based on the identification information of the CEF.

6. The CEF of claim 5, wherein the second message further includes a reference identifier for a connection between the CEF and the IRF.

7. The CEF of claim 5, wherein the first message indicates a resource for a context of the terminal by using a representational state transfer ful (RESTFUL) style,
   wherein the context of the terminal to which the UDR accesses is identified by the RESTFUL style, and
   wherein the context of the terminal comprises at least one of a mobility management context, a session management context, a charging context, and an authentication context.

8. The CEF of claim 5, wherein the network function comprises at least one of a mobility management function, a session management function, an authentication function, and a policy/charging function.

9. A method performed by a unified data repository (UDR) in a mobile communication system, the method comprising:
   receiving, from a capability exposure function (CEF), a first message for requesting information on an interconnection and routing function (IRF) associated with a service for a terminal, the first message including an identifier of the terminal;
   transmitting, to the IRF identified based on the identifier of the terminal, a notification of the reception of the first message for the terminal; and
   transmitting, to the CEF as a response to the first message, a second message including address information on the IRF,
   wherein a third message for the service is delivered from the CEF via the IRF to a network function associated with the service,
   wherein identification information of the CEF included in the first message is transmitted to the network function, and validity of the third message is identified by the network function based on the identification information of the CEF, and
   wherein a fourth message as a response to the third message is delivered from the network function via the IRF to the CEF.

10. The method of claim 9, wherein the second message further includes a reference identifier for a connection between the CEF and the IRF.

11. The method of claim 9, wherein the first message indicates a resource for a context of the terminal by using a representational state transfer ful (RESTFUL) style,
    wherein the context of the terminal to which the UDR accesses is identified by the RESTFUL style, and wherein the context of the terminal comprises at least one of a mobility management context, a session management context, a charging context, and an authentication context.

12. The method of claim 9, wherein the network function comprises at least one of a mobility management function, a session management function, an authentication function, and a policy/charging function.

13. A unified data repository (UDR) in a mobile communication system, the UDR comprising:
   a transceiver configured to transmit or receive a signal; and
   a controller coupled with the transceiver and configured to:
   receive, from a capability exposure function (CEF), a first message for requesting information on an interconnection and routing function (IRF) associated with a service for a terminal, the first message including an identifier of the terminal,
   transmit, to the IRF identified based on the identifier of the terminal, a notification of the reception of the first message for the terminal, and
   transmit, to the CEF as a response to the first message, a second message including address information on the IRF,
   wherein a third message for the service is delivered from the CEF via the IRF to a network function associated with the service,
   wherein identification information of the CEF included in the first message is transmitted to the network function, and validity of the third message is identified by the network function based on the identification information of the CEF, and
   wherein a fourth message as a response to the third message is delivered from the network function via the IRF to the CEF.

14. The UDR of claim 13, wherein the second message further includes a reference identifier for a connection between the CEF and the IRF.

15. The UDR of claim 13, wherein the first message indicates a resource for a context of the terminal by using a representational state transfer ful (RESTFUL) style,
   wherein the context of the terminal to which the UDR accesses is identified by the RESTFUL style, and
   wherein the context of the terminal comprises at least one of a mobility management context, a session management context, a charging context, and an authentication context.

16. The UDR of claim 13, wherein the network function comprises at least one of a mobility management function, a session management function, an authentication function, and a policy/charging function.

* * * * *